Feb. 12, 1952   J. LATTUCA   2,585,561
RECEPTACLE COMB
Filed Jan. 23, 1948
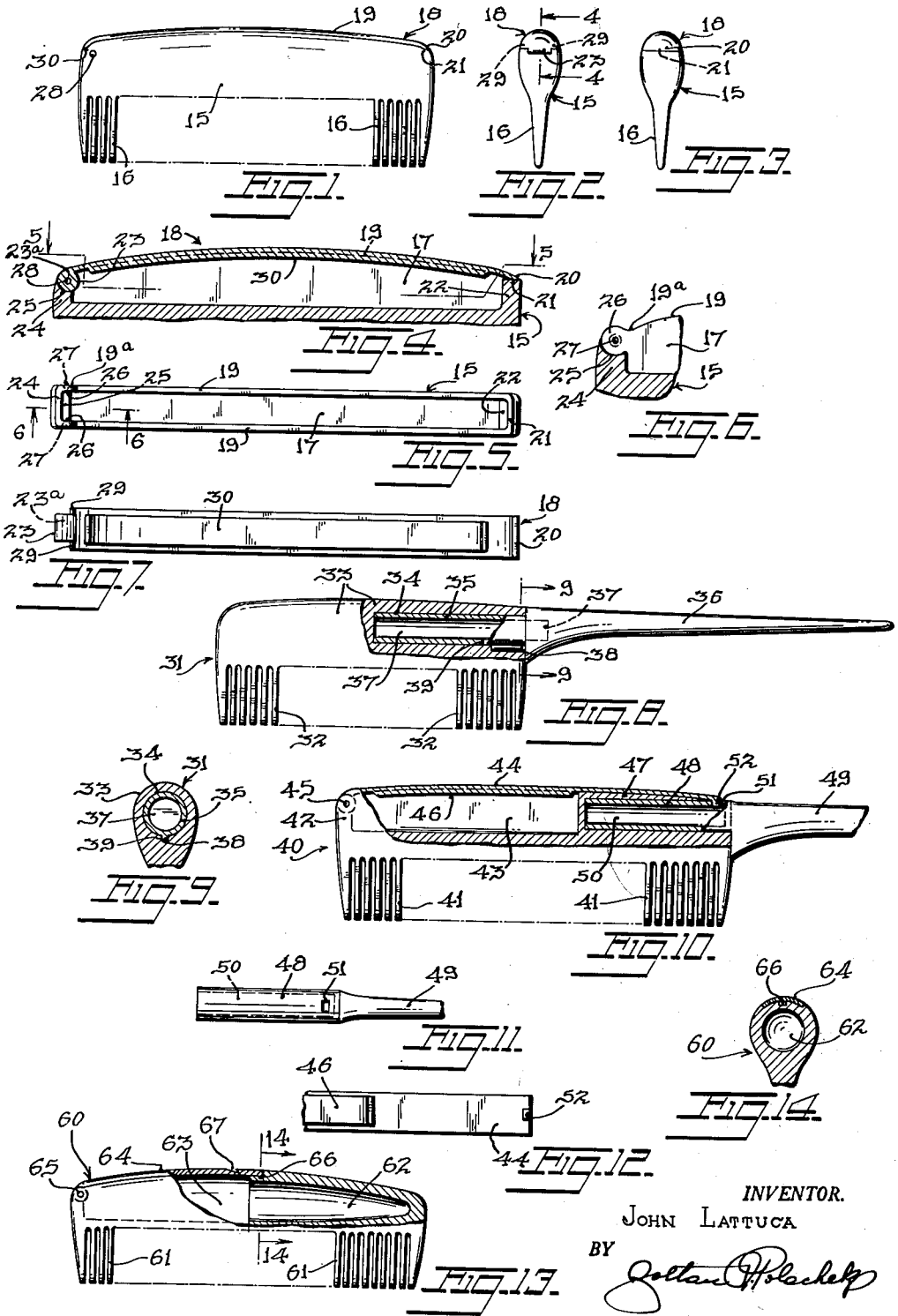
INVENTOR.
JOHN LATTUCA
BY
ATTORNEY Patented Feb. 12, 1952

2,585,561

UNITED STATES PATENT OFFICE 2,585,561

RECEPTACLE COMB

John Lattuca, Brooklyn, N. Y.

Application January 23, 1948, Serial No. 3,899

6 Claims. (Cl. 132—79)

This invention relates to combs.

More particularly, it aims to provide an improved comb equipped with an openable receptacle for storing hair dressing auxiliaries such as hair pins, Bobbie pins, and the like.

The invention thus provides a receptacle comb; and a particular feature of the invention is a placement of the receptacle on the comb such that ordinary and customary use of the comb is not interfered with or hampered in any way, yet access to the receptacle may be had conveniently and quickly and this by relative movement between the main comb structure and a closure for the receptacle.

In one way of carrying out the invention, the backing of the comb, that is, the bar-like comb portion from which a line of teeth is projected, is hollowed out to provide the receptacle, and a hingedly mounted lid is the closure for the receptacle. A preferable feature in this connection is a hinge means and a shaping of the lid such that when the latter is moved to close the receptacle, a smooth and comfortably shaped exterior conformation is a characteristic of said bar-like comb portion despite the presence of the lid and its hinge mounting means.

According to another way of carrying out the invention, the comb has extended therefrom a handle, readily removable from and readily attachable to the comb, with said handle hollowed out to provide the receptacle. A preferable feature in this connection is a keying means partially carried by the comb and partially carried by the handle, whereby relative rotative movement is prevented between the comb and handle while the receptacle is closed by insertion of the handle into the comb and the comb is in use.

According to still another way of carrying out the invention, the comb is equipped with a plurality of receptacles, as one for containing hair pins and another for containing Bobbie pins. A preferable feature in this connection is an arrangement whereby each receptacle may be separately fully opened, for access to its contents, yet an interlocking means is provided between the closures individually assigned one to each receptacle. With, for example, one receptacle in said bar-like portion of the comb, and another in a hollow portion of a handle, a keying means for the purpose above stated may serve also as said interlocking means.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a side elevational view showing an embodiment of the invention as now favored.

Fig. 2 is an end elevation thereof, looking toward the right in Fig. 1.

Fig. 3 is an end elevational view, looking toward the left in Fig. 1.

Fig. 4 is a fragmentary longitudinal vertical section, taken on the line 4—4 of Fig. 2.

Fig. 5 is a longitudinal horizontal section, taken on the line 5—5 of Fig. 4, with the lid omitted.

Fig. 6 is a fragmentary vertical section, taken on the line 6—6 of Fig. 5.

Fig. 7 is a bottom plan view of the lid.

Fig. 8 is a side elevational view, partially broken away and partially in section, showing another embodiment of the invention as now favored.

Fig. 9 is a transverse vertical section, taken on the line 9—9 of Fig. 8.

Fig. 10 is a view similar to Fig. 8, but showing still another embodiment of the invention as now favored.

Fig. 11 is a top plan view of the removable handle, detached from the comb.

Fig. 12 is a fragmentary bottom plan view of a hingedly mounted lid, showing the swinging end thereof which when the lid is closed overlies the portion of the handle inserted into the comb.

Fig. 13 is a similar view to Fig. 8, showing another form of the invention.

Fig. 14 is a fragmentary vertical sectional view taken on the line 14—14 of Fig. 13.

Referring to the drawings more in detail, and first to Figs. 1-7, the comb illustrated comprises a bar-like backing portion 15, offset from the bottom of which is a line of teeth 16.

The backing portion 15 of the comb is hollowed out to provide an open-top receptacle 17, such receptacle normally closed by an openable lid 18. As here shown, the receptacle has a flat bottom, but with its top limits defined by the longitudinally convexly curved top surfaces 19 of its two like side walls.

The lid 18 over substantially its entire length is curvilinearly shaped to match the said top curvatures 19 of the side walls of the receptacle. At its swinging end, the lid 18 is transversely chamfered providing a formation 20 for nicely fitting over a downward slope 21 constituting the outer subdivision of an end wall 22 for the receptacle. A part of the hinging means for the lid is carried at its opposite end, and this means will now be described.

The part of said hinging means carried by the lid 18 is a central terminal projection 23, arranged on the lid as shown in Figs. 4 and 7. This projection 23 where it extends beyond the main part of the lid is truly cylindrical, and is centrally provided with a hole 23ª.

The interfitting parts of the hinging means carried by the backing portion 15 comprise shaped surfaces of the end wall 24 of the receptacle. These surfaces are an arcuately extending seat 25 conforming in radius to that of the cylindricity of the projection 23, and the inner surfaces 26 of the adjacent ends of the side walls of the receptacle marking the opposite limits of the seat 25 laterally of the backing portion 15 of the comb.

The ends of the side walls of the backing portion 15 have aligned apertures 27, countersunk as indicated in Figs. 5 and 6, said apertures being located at the center of curvature of the seat 25. A pivot pin 28 is passed through the hole 23ª and the apertures 27 pivotally mounting the lid 18 as illustrated best in Fig. 4, from which it will be noted that with the lid closed the comb at the hinge location has a smooth exterior, without projecting parts to catch in the hair or bear uncomfortably against the hand.

Also with the lid 18 closed, the comb over the entire length of the lid is absolutely smooth, not only where the elements 20 and 21 closely come together as above stated, and also along the marginal side portions of the lid where the undersurface thereof closely hugs the rounded top surfaces 19 of the side walls of the receptacle, but also at the ends 29 of said marginal side portions, which ends 29 are shaped at the underside of the lid to match top shapings 19ª of the side walls of the receptacle where the top surfaces 19 of said walls change direction to shape the upper ends of the surfaces 26 marking the opposite limits of the seat 25 laterally of the portion 15 of the comb.

The receptacle 17 may be made large enough to house a fairly large supply of hair pins, Bobbie pins or the like. When the receptacle is to be opened, the lid 18 may be easily lifted for upward swing to open the top of the receptacle by applying finger grasp to the two side edges of the lid and then pulling upward on the lid. The relatively movable parts of the hinge mounting are fitted together for the maintenance of sufficient friction therebetween, to hold the lid closed; which friction drag, however, will not interfere with easy opening of the lid as just described.

The lid 18 along the major part of its length is centrally thickened to provide a pad 30 at its bottom, this pad of a width such that it easily fits at its opposite sides against the inner surfaces of the side walls of the receptacle but without undue play laterally of the receptacle.

Referring to the modification of Figs. 8 and 9, here a comb 31 is illustrated having a line of teeth 32 offset from a bar-like portion 33 hollowed out as shown to provide a cylindrical well 34. Insertable into this well is a cylindrical plug-extension 35 from a handle 36. Said extension 35 is cylindrically hollowed out to provide a storage receptacle 37, as for a plurality of hair pins, Bobbie pins or the like. The external diameter of the extension 35 is so close to the diameter of the well 34 that, while the handle 36 may without difficulty be separated from the comb, friction will prevent accidental endwise withdrawal of the extension 35 from the well 34 once the comb and handle have been coupled up as shown in Fig. 8. For preventing relative rotative movement between the comb and the handle, a keying means is shown, comprising a key element 38 on the plug-extension 35 and a keyway 39 forming a bottom enlargement of the well 34 near its outer end.

Referring to the form of the invention shown in Figs. 10–12, a comb 40 is illustrated having a line of teeth 41 offset from a back portion 42. The back portion 42 of the comb is hollowed out to provide a receptacle 43, closable by a lid 44. Said lid is hingedly mounted at 45 as explained in connection with Figs. 1–7, and otherwise made to have undersurfaces engaging top surfaces of the walls surrounding the receptacle 42 in accordance with the principles explained in describing Figs. 1–7. The lid 44 is provided with a bottom pad 46 corresponding to the pad 30 and almost as long as the receptacle 43, although, for a purpose to be explained in a moment, the lid 44 is considerably longer than the receptacle 43.

The comb portion 42, beyond the end of the receptacle 43 remote from the hinge means 45, is hollowed out to provide a cylindrical well 47. Insertable into this well is a cylindrical plug-extension 48 from a handle 49. Said extension is cylindrically hollowed out to provide a second receptacle 50. The external diameter of the extension 48 may be such, relative to the diameter of the well 47, that easy and frictionless insertion and removal of the extension 48 may be had, because by means partially carried by said extension and partially carried by the lid 44, the lid and said extension are interlocked on closing the lid following insertion of said extension.

This interlock is effective to hold the said extension against removal from the comb and also to prevent relative rotative movement between the comb and the handle.

The said interlock means comprises a recess 51 carried by the plug-extension 48 and a projection 52 dependent from the lid 44 at its swinging end and enterable into the recess 51, when, following insertion of the extension 48 into the well 47 with the recess 51 uppermost, the lid is lowered to close the receptacle 43. The projection 52 is of a cross-section to match that of the recess 51, and said projection enters said recess when the portion of the lid 44 beyond its pad 46 is lowered down onto the top surface of the comb portion 42 where said portion overlies the well 47. Said top surface of the comb portion 42, and the under surface of the lid 44 beyond its pad 46, are matchingly shaped.

The receptacle 43 provides storage for a plurality of hair pins, and the receptacle 50 provides storage for plurality of Bobbie pins.

In Figs. 13 and 14, a comb 60 is illustrated with teeth 61 and with receptacle 62 in the handle portion of the comb.

A lid 64 is hinged to the handle portion at 65. The other end of the lid is provided with a snap catch 66. The lid 64 may be opened by engaging one's finger-nail in the indentation 67 and then the lid may be swung to open position on the hinge 65 so as to expose substantially one-half of the comb receptacle 62 as indicated at 63.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a comb having a backing portion, said backing portion being hollowed out to provide a plurality of receptacles, one of said receptacles opening to the top of the backing portion and the other opening to one end of the backing portion, a pivotally mounted lid for the receptacle which opens to the top of the backing portion, a hollow plug inserted in the receptacle which opens to the end of the backing portion and means on said lid for engaging said plug in the closed position of said lid for retaining said plug in position in its respective receptacle.

2. In a comb having a backing portion and a separate handle, a plug on one end of the handle in axial alignment therewith, the backing portion having a well extended in from one end thereof and into which said plug is extended, the backing portion having adjacent its other end a receptacle which opens to the top of the backing portion, a lid pivotally mounted at one end to the said other end of the backing portion for closing the open top of said receptacle, said lid having at its other end an extension which extends across the top of the backing portion and slightly beyond the said one end thereof in the closed position of said lid, and means on said extension engaging said plug in the closed position of said lid for retaining said plug in position in said well and retaining the handle in position on the backing portion.

3. In a comb having a backing portion and a separate handle, a plug on one end of the handle in axial alignment therewith, the backing portion having a well extended in from one end thereof and into which said plug is extended, the backing portion having adjacent its other end a receptacle which opens to the top of the backing portion, a lid pivotally mounted at one end to the said other end of the backing portion for closing the open top of said receptacle, said lid having at its other end an extension which extends across the top of the backing portion and slightly beyond the said one end thereof in the closed position of said lid, and means on said extension engaging said plug in the closed position of said lid for retaining said plug in position in said well and retaining the handle in position on the backing portion, and a pad on the inner face of said lid to extend into said receptacle in the closed position of said lid retaining the lid against lateral movement relative to the backing portion.

4. In a comb having a backing portion and a separate handle, a plug on one end of the handle in axial alignment therewith, the backing portion having a well extended in from one end thereof and into which said plug is extended, the backing portion having adjacent its other end a receptacle which opens to the top of the backing portion, a lid pivotally mounted at one end to the said other end of the backing portion for closing the open top of said receptacle, said lid having at its other end an extension which extends across the top of the backing portion and slightly beyond the said one end thereof in the closed position of said lid, and means on said extension engaging said plug in the closed position of said lid for retaining said plug in position in said well and retaining the handle in position on the backing portion, said plug having a receptacle extend in from its free end.

5. In a comb having a backing portion and a separate handle, a plug on one end of the handle in axial alignment therewith, the backing portion having a well extended in from one end thereof and into which said plug is extended, the backing portion having adjacent its other end a receptacle which opens to the top of the backing portion, a lid pivotally mounted at one end to the said other end of the backing portion for closing the open top of said receptacle, said lid having at its other end an extension which extends across the top of the backing portion and slightly beyond the said one end thereof in the closed position of said lid, and means on said extension engaging said plug in the closed position of said lid, for retaining said plug in position in said well and retaining the handle in position on the backing portion, said retaining means comprising a projection on the free end of said extension extended toward the backing portion, said plug having a portion exposed beyond the said one end of the backing and formed with a recess into which said projection extends in the closed position of said lid.

6. In a comb having a backing portion and a separate handle, a plug on one end of the handle in axial alignment therewith, the backing portion having a well extended in from one end thereof and into which said plug is extended, the backing portion having adjacent its other end a receptacle which opens to the top of the backing portion, a lid pivotally mounted at one end to the said other end of the backing portion for closing the open top of said receptacle, said lid having at its other end an extension which extends across the top of the backing portion and slightly beyond the said one end thereof in the closed position of said lid, and means on said extension engaging said plug in the closed position of said lid for retaining said plug in position in said well and retaining the handle in position on the backing portion, said retaining means comprising a projection on the free end of said extension extended toward the backing portion, said plug having a portion exposed beyond the said one end of the backing and formed with a recess into which said projection extends in the closed position of said lid, said well and said plug being of complementary circular cross-section and said engagement of said projection with said recess serving to retain the handle against rotation relative to the backing portion.

JOHN LATTUCA.

REFERENCES CITED

The following references are of record in the file of this patent:

UNITED STATES PATENTS

| Number | Name | Date |
| --- | --- | --- |
| D. 148,382 | Oriolo et al. | Jan. 13, 1948 |
| 1,059,537 | Hanson | Apr. 22, 1913 |
| 1,189,852 | Melin | July 4, 1916 |
| 2,191,254 | Harmon | Feb. 20, 1940 |
| 2,497,983 | Fabis | Feb. 21, 1950 |

FOREIGN PATENTS

| Number | Country | Date |
| --- | --- | --- |
| 342,629 | Great Britain | Feb. 5, 1931 |